Patented May 29, 1934

1,960,538

UNITED STATES PATENT OFFICE 1,960,538

PROCESS OF PRODUCING CEMENTITIOUS MATERIAL

Gilbert A. Hoggatt, Buffalo, N. Y., assignor to Certain-Teed Products Corporation, New York, N. Y., a corporation of Maryland No Drawing. Application March 25, 1932, Serial No. 601,285

15 Claims. (Cl. 106—34)

This invention relates to the manufacture of calcined gypsum and contemplates a new process whereby a calcined gypsum product is obtained which requires less water to bring it, in mixing, to the consistency desired for a workable slurry or mortar than is required by the calcined gypsum manufactured under standard procedure at present.

An object of this invention is to control the water carrying capacity of calcined gypsum so that for a given gypsum rock a calcined product with any desired water carrying capacity may, within reasonable limits, be obtained. The "water carrying capacity" is the amount of water, calculated as percentage by weight of the dry material, which is necessary to bring the mixture to "testing consistency". In my prior application, Serial No. 312,937, filed October 16, 1928, of which application the present application is a continuation in part, I have set forth a definition of "testing consistency" accepted as standard at the time of filing said application Serial No. 312,937. By this definition a neat mortar mixture is of "testing consistency" when it gives a circular pat, averaging 9.7 centimeters in diameter when tested with a Southard viscosimeter, according to the standard procedure prescribed by the American Society for Testing Materials, and is expressed as the number of cubic centimeters of water required to be added to one hundred (100) grams of the plaster, such as calcined gypsum.

In practice it is found, depending upon the quality, age and other conditions of the calcined gypsum, that one hundred parts of calcined gypsum require from 65 to 100 parts of water by weight, in order to produce a slurry of pouring consistency as required for casts or molds. This calcined gypsum enters into chemical combination with 16 to 25% of its own weight of water, as water of crystallization, in setting or hardening. It is apparent that a large percentage of water is left to be eliminated by evaporation or absorption by the mold in order to produce the desired product in its dry, set and hardened form. In other words, for every 100 grams of calcined gypsum requiring 70 grams of water to produce a slurry of pouring consistency, approximately 54 to 45 grams of water by evaporation or absorption by the mold must be eliminated from a cast made from such a slurry. This results in the formation of cells or voids in the finished product to such an extent as to materially reduce its density and strength. A low water carrying capacity is necessary where high density and strength of the resulting products are important. The smaller the amount of water required to produce a slurry or mortar, the denser and stronger is the resultant cast.

Heretofore it commonly has been the practice to produce calcined gypsum of reduced water carrying capacity by manufacturing the calcined gypsum according to the usual calcining process and storing the product for a period of time. It has been found by experience that during the time of storage the characteristics of the gypsum are modified in such a way that its water carrying capacity is reduced from that which it possesses immediately upon completion of calcination. Such modification of the water carrying capacity is termed the "natural ageing" of the calcined gypsum. The process of "natural ageing" requires considerable time and is subject to uncontrollable variations due to the changes in atmospheric conditions.

Another object, therefore, of the present invention is to provide a process of treating gypsum, preferably during the process of calcination, whereby the water carrying capacity of the calcined gypsum is reduced by virtue of the effect which certain materials have on the gypsum during calcination. Moreover, by the use of this process the water carrying capacity of the calcined gypsum produced may be controlled by a variation in the amount of these materials present during calcination.

I have discovered in calcining gypsum rock to produce calcined gypsum that the admixture to the gypsum to be calcined or the addition thereto while being calcined of certain substances which will lower the calcining temperature, that is, the decomposition or inversion temperature, of the gypsum will lower the water carrying capacity of the calcined gypsum. The decomposition or inversion temperature, as it is understood in connection with water of crystallization of salts and other compounds which take up water in forming crystals, is the temperature at which the vapor pressure of the water of crystallization of the salt or of the compound is equal to or just exceeds the partial pressure of the water vapor in the surrounding medium or equals or exceeds the saturation pressure if the medium is saturated with water vapor. In the case of gypsum being calcined under standard calcining procedure the pressure in the apparatus is substantially atmospheric pressure since in such a standard process the ground gypsum is heated in a kettle open to the atmosphere or the kettle is maintained at atmospheric pressure and the calcining process is carried on by heating the kettle without permitting substantial rise of the pressure within the kettle in driving off the water of crystallization from the gypsum. However, the partial pressure of the water vapor in the kettle may be less than the pressure of saturated water vapor at the temperature existing within the kettle. The process of my invention, however, does not depend upon the use of any particular pressure and the results may be obtained in calcining processes operating at pressure other than atmospheric pressure.

I have found by adding the substance of the character above mentioned to the gypsum at such a time in its preparation for calcining as will insure the presence of the substance within the kettle during calcination, that I may obtain the reduction of the decomposition temperature. This reduction, whether itself a cause of the lowering of the water carrying capacity of the calcined gypsum or only as an incidental phenomenon, is characteristic and indicative of the effect upon the calcining process and upon the water carrying capacity of the calcined product of calcining the gypsum in the presence of such a substance.

I am aware that the use of deliquescent chlorides of certain alkaline earth metals heretofore has been proposed to produce "aged" calcined gypsum, but broadly I base my invention upon the use of non-deliquescent substances capable of forming true molecular solutions in water and capable of lowering the decomposition temperature of the gypsum. In another phase, my invention rests upon the use of certain alkali compounds. By alkali compounds I mean compounds of the alkali metals or of their equivalent, the ammonium radical $NH_4$, in the form of salts of organic or of inorganic acids or in the form of alkalis, all of which alkali compounds as used in my invention are of the type which form molecular solutions in water. The salts included among these compounds may be termed "alkali salts". I also include among said alkali compounds those compounds, whether alkalies or "alkali salts", which are non-deliquescent. More specifically, I include also the halogen compounds of the alkali metals or of their equivalent, the ammonium radical, whether or not said halogen compounds are deliquescent or non-deliquescent.

Among the substances which I have found effective for the purpose of my invention are:

Ammonium chloride
Sodium bromide
Sodium chloride
Sodium citrate
Sodium sulphate
Potassium bromide
Potassium chloride
Potassium iodide
Potassium nitrate
Ammonium acetate
Lithium bromide
Lithium chloride
Lithium iodide
Sodium iodide I have also determined that mixtures of these substances may be used and I have used mixtures such as sodium chloride with ammonium acetate, sodium chloride with ammonium acetate and sodium iodide and I have also used sodium chloride with sodium bromide and sodium iodide.

I have also used both in tests and in actual manufacture, to depress the decomposition temperature and to reduce the water carrying capacity of the calcined product, hydrochloric acid introduced into the kettle or otherwise added to the gypsum before completion of the calcination. I believe that similar action will be obtained by the use of other halogen acids and I include within my invention the use of such halogen acids.

By careful tests with all of the above mentioned substances and with said mixtures in calcining gypsum and also by the use of some of them in the actual manufacture of calcined gypsum on a commercial scale, I have found that a marked reduction in the water carrying capacity of the calcined gypsum is effected. For example, I have found that the normal water carrying capacity for a certain freshly calcined gypsum calcined without the use of such re-agents is 68 cc., as tested by the method defined above. By the use of one of the re-agents, sodium chloride for example in the amount of three pounds per ton of calcined gypsum produced, I have reduced to 54 cc. the water carrying capacity of this same gypsum as tested when freshly calcined. Similarly, by the use of ammonium chloride I have reduced the water carrying capacity of this same gypsum in a similar degree.

With another grade of gypsum, I have obtained reduction of the water carrying capacity of the freshly calcined product from 77 cc. for the untreated gypsum to 62 cc. for the same gypsum treated with 1.2 lbs. of sodium chloride per ton of calcined gypsum.

The other substances indicated above as suitable reagents produce the same or similar results.

Other re-agents which I believe to be effective for this purpose, either alone or in mixtures, include the acetates, citrates, nitrates and sulphates, as well as the hydroxides of ammonium, lithium, sodium and potassium, in addition to those which have been mentioned above.

While it is well known that the vapor pressure of water solutions of many substances is lower than that of the water alone, and while substances such as are mentioned above as being effective for the reduction of the decomposition or inversion temperature of the gypsum are among those which lower the vapor pressure of water when in solution therein, and while the relation of these phenomena is not so apparent as entirely to explain the result obtained, namely the reduction of the water carrying capacity of the calcined gypsum, nevertheless, by my experiments and test, as well as by actual manufacture of calcined gypsum when using such re-agents, I have effectively reduced the water carrying capacity of the calcined product and thus accomplished the desired "artificial ageing" of the calcined gypsum, that is the reduction of its water carrying capacity by so calcining the gypsum at the reduced decomposition temperature produced by the pressure of such re-agents.

This new process is of economic importance, because it facilitates the manufacture or production of calcined gypsum of desired water carrying capacity at low temperatures and in short periods of time. Heretofore, calcined gypsum of low water carrying capacity has been manufactured by prolonged periods of calcination, calcination at high temperatures, or by "natural ageing" of the calcined products, as above mentioned. The two former processes involved expenditures of heat and time and result in increased expense for fuel and labor. The latter process, as stated above, is dependent on weather conditions and upon the temperature and humidity of the atmosphere as well as upon storage conditions, and is, moreover, very expensive in that large stocks of calcined gypsum must be kept idle for considerable periods of time. By the present invention a calcined gypsum product of reduced water carrying characteristics is obtained upon completion of calcination and with a minimum expenditure of heat, time and labor. Moreover, the process can be so controlled as to produce within limits any desired water carrying capacity. However, my invention may be used in combination with any of the former processes to still further reduce or to suitably modify the water carrying capacity obtained by such processes.

As an illustration of one manner in which I carry out my process, I may introduce, for example, sodium chloride or commercial salt into the kettle or into any other type of calcining equipment during calcination. My process can be carried out as well with chemically pure sodium chloride as with commercial salt. When my invention is practiced in this manner a predetermined amount of salt may be dissolved in water in the ratio of about three pounds of salt per gallon of water and placed in a suitable container. This container may be equipped with compressed air connections and connections to a spraying device, so that when the compressed air is admitted into the container the salt solution is froced in a fine spray directly into or upon the calcining mass. However, the salt may be introduced into the kettle in any other convenient manner. The amount of salt used depends to some extent upon the character of the rock to be treated and upon the water carrying capacity desired to be obtained.

The following table indicates results obtained on a certain grade of material which under the standard method of calcination showed a water carrying capacity of 68 cc. when tested upon completion of the calcining operation.

| Pounds of of salt per ton of calcined gypsum | Percent salt | Water carrying capacity of the calcined product |
| --- | --- | --- |
| | | cc. |
| 0 | .000 | 68 |
| 0.10 | 0.005 | 66 |
| 1 | .050 | 59 |
| 2 | .100 | 57 |
| 3 | .150 | 54 |
| 5 | .250 | 51 |

It can be seen that by varying the amount of salt for a given rock any desired water carrying capacity can be obtained, within reasonable limits. I have stated that this invention does not depend on the use of deliquescent materials as agents to produce the result required. This fact I ascertained in tests in which chemically pure sodium chloride (Baker's Analyzed) was used during calcination. The gypsum as calcined in the ordinary way was found to have a water carrying capacity of 68. When subjected to the process of this invention (using chemically pure sodium chloride) the water carrying capacity of the same material was reduced to 54. This reduction was precisely the same as that manifested when using ordinary commercial salt during calcination in the same quantity and under the same conditions. Similar results have been obtained with the other substances which I have used as set forth above.

In the regular calcination process when no salt is present, the gypsum "boils" or calcines for about forty minutes at about 240 to 250° Fahrenheit. When salt, sodium chloride, is present, for instance in amounts of from 1 to 3 pounds per ton, the boiling temperature drops to a range of about 235 to 225° Fahrenheit, indicating that the decomposition temperature of the gypsum is lowered by the presence of the salt. In some instances, I have found that the presence of salt in greater or less proportions than from one to three pounds per ton is necessary to achieve the desired result. Similar results may be obtained with the other re-agents of the type described above as included in my invention.

I claim:

1. The process of manufacture of calcined gypsum which comprises calcining gypsum to produce a product retaining a part of the water of crystallization and capable of setting and adding to the gypsum before completion of the calcining operation a water soluble alkali compound containing a halogen.

2. The process of manufacture of calcined gypsum which comprises calcining gypsum to produce a product retaining a part of the water of crystallization and capable of setting, and adding thereto before completion of the calcining operation a water soluble alkali metal compound containing a halogen.

3. The process of manufacture of calcined gypsum which comprises calcining gypsum to produce a product retaining a part of the water of crystallization and capable of setting, and adding thereto before completion of the calcining operation a water soluble alkali salt of a halogen acid.

4. The process of manufacture of calcined gypsum which comprises calcining gypsum to produce a product retaining a part of the water of crystallization and capable of setting, and adding sodium chloride thereto before completion of the calcining operation.

5. The process of manufacture of calcined gypsum, which comprises calcining gypsum to produce a product retaining a part of the water of crystallization and capable of setting, and adding thereto ammonium chloride before completion of the calcining operation.

6. The process of controlling the water carrying capacity of calcined gypsum which comprises spraying into contact with the gypsum as it is being calcined to produce a product retaining a part of the water of crystallization and capable of setting, a controlled amount of a water solution of a water soluble alkali compound containing a halogen.

7. The process of producing calcined gypsum which comprises subjecting the gypsum as it is being calcined to produce a product retaining a part of the water of crystallization and capable of setting to the action of a fraction of one per cent of sodium chloride brought into contact with the gypsum before completion of the calcining process.

8. The method of controlling the water carrying capacity of calcined gypsum which comprises adding sodium chloride to the gypsum as it is being calcined to produce a product retaining a part of the water of crystallization and capable of setting, and varying in accordance with variations in said water carrying capacity of the calcined gypsum produced the amount of sodium chloride brought into contact with the gypsum being calcined.

9. The process of dehydrating calcium sulphate which comprises heating hydrous calcium sulphate to drive off a part of the water of crystallization to produce a product having the property of setting when mixed with water, and subjecting the mass being so heated to the action of a water soluble alkali compound containing a halogen to modify the normal water carrying capacity of the dehydrated calcium sulphate.

10. The process of manufacture of calcined gypsum which comprises calcining gypsum to produce a product retaining a part of the water of crystallization and capable of setting, and adding thereto before completion of the calcining operation a mixture of different water soluble alkali compounds, at least one of said compounds containing a halogen.

11. The method of controlling the water carrying capacity of calcined gypsum which comprises adding to the gypsum as it is being calcined to produce a product retaining a part of the water of crystallization and capable of setting a water soluble alkali compound containing a halogen, and varying in accordance with variations in said water carrying capacity of the calcined gypsum produced the amount of said water soluble alkali compound brought into contact with the gypsum being calcined.

12. The process of manufacture of calcined gypsum which comprises calcining gypsum to produce a product retaining a part of the water of crystallization and capable of setting, and adding thereto before completion of the calcining operation a non-deliquescent water soluble alkali compound containing a halogen.

13. The process of manufacture of calcined gypsum which comprises calcining gypsum to produce a product retaining a part of the water of crystallization and capable of setting, and adding thereto before completion of the calcining operation a non-deliquescent water soluble alkali metal compound containing a halogen.

14. The process of manufacture of calcined gypsum which comprises calcining gypsum to produce a product retaining a part of the water of crystallization and capable of setting, and adding thereto before completion of the calcining operation a non-deliquescent water soluble alkali salt of a hologen acid.

15. The process of manufacture of calcined gypsum which comprises calcining gypsum to produce a product retaining a part of the water of crystallization and capable of setting, and adding to the gypsum before completion of the calcining operation commercial salt in quantities of approximately 0.1 pound to 5.0 pounds per ton of the gypsum rock being calcined.

GILBERT A. HOGGATT.